Patented Dec. 25, 1928.

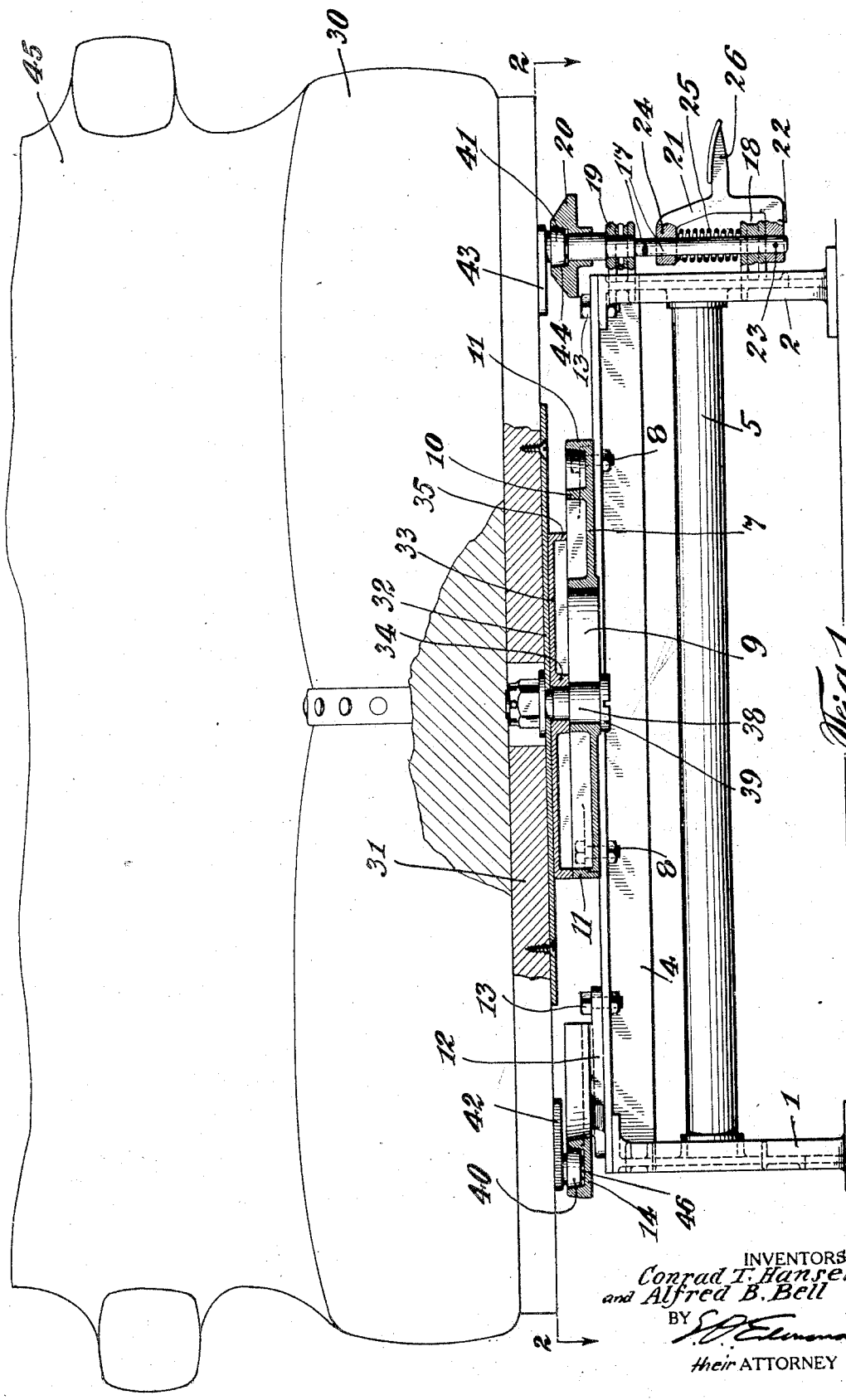

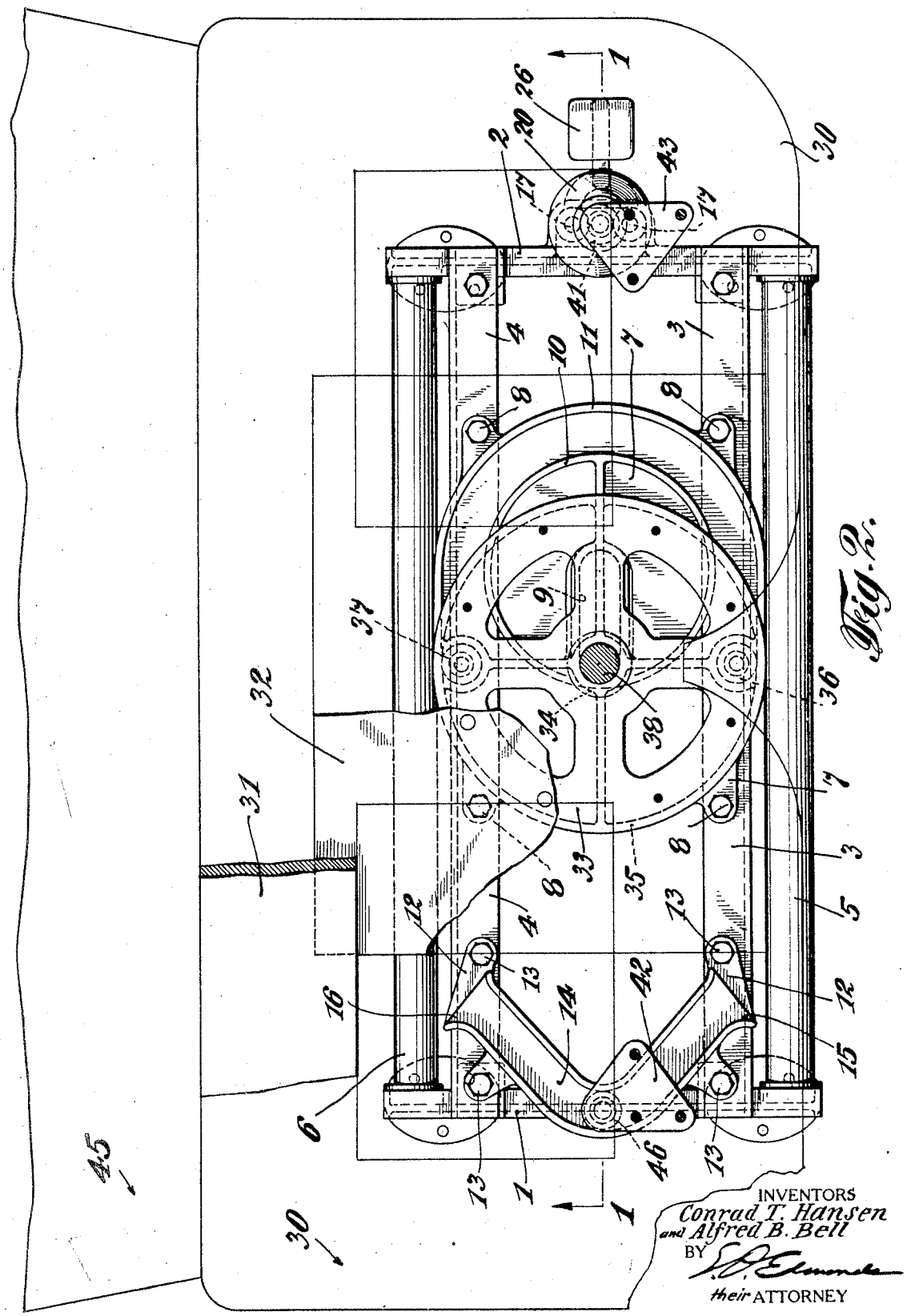

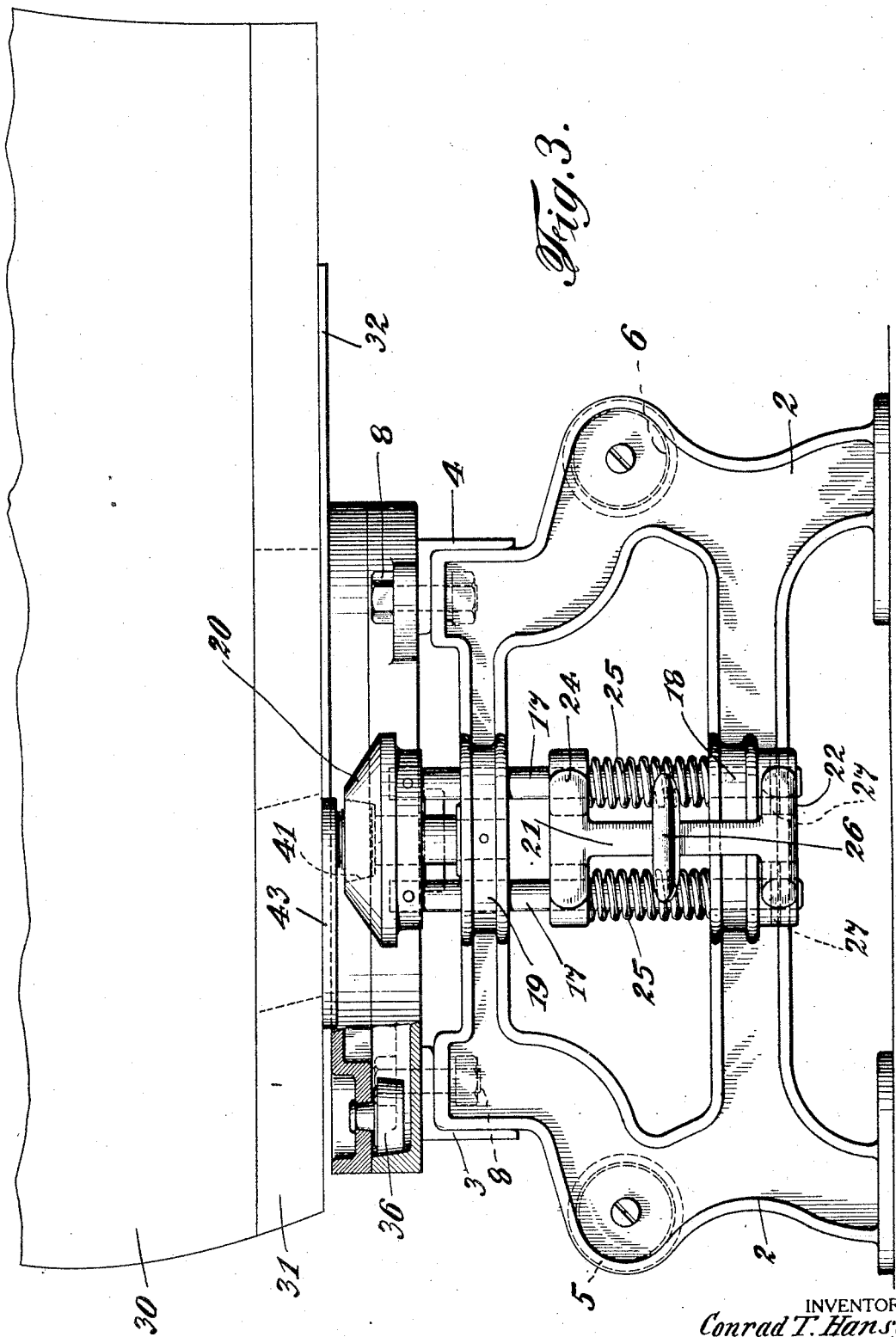

1,696,536

UNITED STATES PATENT OFFICE.

CONRAD T. HANSEN AND ALFRED B. BELL, OF PHILADELPHIA, PENNSYLVANIA, ASSIGNORS TO THE AMERICAN MOTOR BODY CORPORATION, OF PHILADELPHIA, PENNSYLVANIA, A CORPORATION OF DELAWARE.

CAR SEAT.

Application filed August 7, 1926. Serial No. 127,756.

This invention relates to car seats, and more particularly relates to car seats of the type which may be revolved in a horizontal plane to reverse the facing direction of the seat.

The principal object of our invention is to provide a seat of the type referred to, which conserves seating space to the utmost, so that the ordinary railway coach, autobus, or tramcar, may be equipped with these seats without reduction of seating capacity.

A further object of our invention is to provide a seat of the character referred to, which gives maximum comfort, and gives more comfort than can be obtained in the usual coach car seat of the type wherein the seat back is reciprocated from one side of the cushion to the other to permit reversal of the seating direction.

A further object of this invention is to provide a car seat of the type referred to, which is attractive in appearance, exhibiting copious seating space and luxurious and deep upholstery, which pleases the eyes of the passengers.

Another object of this invention is to provide a seat which is simple and easy to reverse as to seating direction, and at the same time cannot of itself move out of position.

Another object of this invention is to provide a seat of the character described, which is firmly and securely supported and steadied at all times, both when at rest and when being rotated.

A further object of this invention is to provide an improved latch mechanism for releasably latching the seat in either seating position.

Other objects of this invention will be in part obvious and in part pointed out hereinafter.

In accordance with our invention, the seat cushion and seat back are secured to a cushion rest, which is rotatably and slidably mounted on a supporting pedestal or framework rigidly attached to the floor of the vehicle. A cam track is secured to the supporting frame, preferably at the end toward the car wall adjacent the seat. Each end of the cushion rest is provided with a roller, which is adapted to engage in this cam track, to cause the cushion rest and the cushion and seat back carried thereon to move away from the car wall at the beginning of the rotation of the seat to reverse its seating direction, and the opposite roller is adapted to engage in this cam track toward the end of this rotative movement of the cushion rest, to draw the cushion rest back into normal position against the adjacent car wall. Members, which may be the studs or the rollers on the cushion rest, are adapted to coact with the bottom of the cam track to steady the seat when in seating position and also during the initial and final periods of rotation. Means are also provided for steadying the cushion rest at the aisle end of the supporting frame, these means preferably being associated with means for latching the seat in either seating position. Preferably, a coacting cam track and rollers are provided on the supporting frame and cushion rest at the center of the construction, to confine the cushion rest as it is rotated on the supporting frame. This cam track may be circular and is adapted to coact with two rollers which travel around the outside of this track, the rollers being spaced apart a distance approximately equal to the diameter of the circular track.

In order that a clearer understanding of this invention may be had, attention is hereby directed to the accompanying drawings, forming a part of this application and illustrating certain embodiments of our invention.

Referring to the drawings, Fig. 1 is a vertical longitudinal sectional view of a seat embodying this invention, and is taken approximately on the line 1—1 of Fig. 2; Fig. 2 is a horizontal sectional view showing the mechanism for supporting the seat, and is taken approximately on the line 2—2 of Fig. 1, certain parts being broken away for the sake of clearness; and Fig. 3 is an end view of the construction at the aisle end thereof.

Similar reference characters refer to similar parts throughout the several views of the drawings.

Referring to the drawings, the supporting structure for the movable parts includes a pair of pedestals 1 and 2, supporting a pair of rails 3 and 4, and also, if desired, supporting foot rails 5 and 6. To these rails 3 and 4 is secured a plate 7, as by bolts 8. This plate has a flanged slot 9 extending parallel with the rails. This plate is also provided with an upright circular flange 10, which surrounds the slot 9 but is eccentrically disposed with respect thereto. The end of the slot 9 toward the car wall is approximately at the center of rotation of the seat when facing in either seating direction. The cam track flange 10 comes close to this end of the slot, but is disposed a substantial distance from the opposite end of this slot. If desired, the plate 7 may be provided with a peripheral flange 11, for purposes which will be described hereinafter.

Another plate 12 is secured to the rails 3 and 4, as by means of bolts 13, at the wall end of the structure. This plate provides a V-shaped cam track 14, which has its apex over the center of pedestal 1 and has flared open ends 15 and 16 adjacent the rails 3 and 4.

At the aisle end of the seat, two vertical plungers 17 are slidably supported in brackets 18 and 19 secured to the pedestal 2. A conical member 20 is secured to the upper ends of both plungers, and is raised and lowered by movement of the plungers. A forked member 21 has its lower arm 22 secured to the ends of the plungers 17 below the bracket 18, as by means of pins 23. The other arm 24 of this forked member loosely encircles the plungers 17 intermediate the brackets 18 and 19. A spring 25 encircles each plunger 17 between the arm 24 and the bracket 18, whereby the forked member and the plungers, together with the cap 20, are resiliently held in raised position. Preferably, the forked member 21 is provided with a suitable pedal projection 26, whereby the plunger 17 and the cap 20 may be lowered by a person pressing on the pedal 26 with his foot.

The seat cushion 30 rests on a wooden frame 31 (cushion rest) which has secured to its underside, at the center, a metal plate 32. At the center of this plate is riveted a metal disk 33, having a hub 34 at its center and having a peripheral flange 35. A pair of studs or rollers 36 and 37 are secured to disk 33 at diametrically opposite points. The diametrical line between these rollers is preferably at right angles to the rails 3 and 4 when the seat is in seating position. A king pin 38 is secured in the hub 34, this pin penetrating the slot 9 of the supporting frame and having an enlarged head 39 wider than the slot engaging beneath the same, whereby the seat cushion is prevented from being raised from the supporting frame.

The cushion rest 31 may be a part of the cushion framework, or may be a separate member on which the seat cushion, including its framework, is supported.

A pair of studs or rollers 40 and 41 are secured to the cushion frame 31 toward each end of the seat, as by means of plates 42 and 43. These studs or rollers are so positioned that they will each coact with the cam track 14, and also with the cap 20 of the latching device at the aisle end of the seat. This cap 20 is provided with a recess 44 in its top surface, shaped to snugly receive these rollers and support them from beneath.

The seat back 45 is attached to the seat cushion, or to the framework which supports the seat cushion, for revolution therewith. The seat back may be supported so as to be stationary with respect to the cushion or to be tiltable thereover, as desired.

The operation of the seat is as follows: When it is facing in either seating direction, the parts will be in a position such as has been illustrated in the drawings. The king pin 38 will be at the wall end of the slot 9. The roller, such as 40, at the wall end will be seated in the cam track 14 at its apex. Preferably, the stud 46 on which this roller is mounted rests on the bottom of the cam track and steadies this end of the seat. The roller, such as 41, at the aisle end will be engaged in the recess of the cap member 20, which thus steadies the seat at the aisle end. The seat is further steadied by the fact that the peripheral flange 35 of the disc 33 rests on the flanges, such as 10 and 11, of the plate 7.

When it is desired to reverse the seating direction of the seat, the roller at the aisle end is released by a person applying his foot to the pedal 26 and depressing the same. The seat, most conveniently the seat back, is then grasped and moved to revolve the back and cushion in a horizontal plane, in either direction desired. As this rotation starts, the engagement of the roller at the wall end in the cam track 14 causes the seat cushion to move away from the car wall a sufficient distance to avoid interference between the car wall and the corners of the seat cushion and the seat back. As the cushion moves away from the car wall, the king pin 38 slides in the slot 9, and the rollers 36 and 37 come into engagement with the cam track 10. At this time, the king pin is at the outer end of the slot, and the seat now revolves about this point, due to the engagement of the rollers 36 and 37 with the track 10, until the roller, such as 41, which was at the aisle end comes into engagement with one end of the cam track 14. At this time, the rollers 36 and 37 leave their engagement with the circular track 10, and are movable away from this track toward the wall of the car. During the final movement of the seat cushion, the coaction between the roller 41, traveling along the cam track 14 to the apex thereof, draws the seat cushion toward the car wall. As the seat arrives in the reversed seating position, the roller, such as 40, which originally was at the wall end of the seat, engages the conical surface of the cap member 20 at the aisle end of the seat, causing this cap member to be depressed and becoming engaged and locked in the recess thereof when it aligns therewith.

The springs 25 of the latch device are preferably made sufficiently strong to give the seat a firm support at the aisle end. The seat is firmly supported and steadied at the wall end by the engagement between the roller and cam track at this end of the seat. The seat is firmly supported and steadied at the center by the engagement between the plates 7 and 33. It is apparent that it is a most simple matter to reverse the seating direction of the seat, and that, when reversed, the seat becomes locked automatically against inadvertent displacement. Neither the jars of travel nor the act of a person can revolve the seat unless the latch device has been properly actuated. No actuation of this device is necessary to lock the seat in position.

Due to the fact that the seat automatically moves away from the car wall during rotation, the seat affords maximum seating space and permits of its being equipped with deep and luxurious upholstery.

In addition to the above, the construction is exceedingly simple, comprising very few parts and requiring no delicate parts, but permitting all parts to be very sturdy and durable.

As many changes could be made in the above construction and as many apparently widely different embodiments of this invention could be made without departing from from the scope thereof, it is intended that all matter contained in the above description or shown in the accompanying drawings shall be interpreted as illustrative and not in a limiting sense.

What we claim is:—

1. In a seat of the character described, in combination, a supporting frame, a seat cushion supported for rotation and shifting on said frame, and means adapted to shift said cushion on said frame in a predetermined manner when the cushion is rotated thereon, said means including a cam track disposed at one end of the supporting frame and members mounted adjacent opposite ends of the seat cushion for movement therewith, said members adapted to enter and leave said cam track and to coact therewith at predetermined times during rotation of the cushion.

2. In a seat of the character described, in combination, a supporting frame, a seat cushion supported for rotation and shifting on said frame, and means adapted to shift said cushion on said frame in a predetermined manner when the cushion is rotated thereon, said means including a cam track disposed at one end of the supporting frame and members mounted adjacent opposite ends of the seat cushion for movement therewith, said cam track having open ends so as to permit said members to enter and leave said track and to coact therewith at predetermined times during rotation of the cushion, there being one of said members resting on said cam track when the cushion is in either of two opposite seating positions, whereby the cushion is supported and steadied at the end adjacent the cam track.

3. In a seat of the character described, in combination, a supporting frame, a seat cushion supported for rotation and shifting on said frame, and means adapted to shift said cushion on said frame in a predetermined manner when the cushion is rotated thereon, said means including a cam track disposed at one end of the supporting frame, members mounted adjacent opposite ends of the seat cushion for movement therewith, adapted to coact with said cam track at predetermined times during rotation of the cushion, a plate mounted centrally on the supporting frame and having a slot, and a king pin for the cushion slidably seated in said slot, whereby the center of the seat cushion is confined during the rotative and shifting movement thereof on the supporting frame.

4. In a seat of the character described, in combination, a supporting frame, a seat cushion supported for rotation and shifting on said frame, and means adapted to shift said cushion on said frame in a predetermined manner when the cushion is rotated thereon, said means including a cam track disposed at one end of the supporting frame, members mounted adjacent opposite ends of the seat cushion for movement therewith, adapted to coact with said cam track at predetermined times during rotation of the cushion, a plate mounted centrally on the supporting frame and having a slot, and a king pin for the cushion slidably seated in said slot, whereby the center of the seat cushion is confined during the rotative and shifting movement thereof on the supporting frame, said plate on the supporting frame having a circular cam track disposed eccentrically with respect to the slot, and a pair of members secured to the seat cushion and disposed at opposite sides of the king pin, adapted to coact with said circular cam track, maintaining the seat cushion in shifted position during an intermediate stage of its rotation from one seating position to the reverse seating position.

5. In a seat of the character described, in combination, a supporting frame, a seat cushion supported for rotation and shifting on said frame, and means adapted to shift said cushion on said frame in a predetermined manner when the cushion is rotated thereon, said means including a cam track disposed at one end of the supporting frame, members mounted adjacent opposite ends of the seat cushion for movement therewith, adapted to coact with said cam track at predetermined times during rotation of the cushion, a plate mounted centrally on the supporting frame and having a slot and a king pin for the cushion slidably seated in said slot, whereby the center of the seat cushion is confined during the rotative and shifting movement thereof on the supporting frame, said plate on the supporting frame having a circular cam track disposed eccentrically with respect to the slot, and a pair of members secured to the seat cushion and disposed at opposite sides of the king pin, adapted to coact with said circular cam track, maintaining the seat cushion in shifted position during an intermediate stage of its rotation from one seating position to the reverse seating position, said members coming into engagement with said circular track as the member adjacent the end of the seat cushion leaves its engagement with the cam track at the end of the supporting frame, and ceasing their engagement with said circular cam track as one of the members adjacent the end of the seat cushion comes into engagement with the cam track at the end of the supporting frame.

6. In a seat of the character described, in combination, a supportnig frame, a seat cushion supported for rotation and shifting on said frame, means adapted to shift said cushion on said frame in a predetermined manner when the cushion is rotated thereon, said means including a cam track disposed at one end of the supporting frame and members mounted adjacent opposite ends of the seat cushion for movement therewith, adapted to coact with said cam track at predetermined times during rotation of the cushion to shift the same, and means adapted to engage one of said members for latching the seat cushion in either of two reversed seating positions.

7. In a seat of the character described, in combination, a supporting frame, a seat cushion supported for rotation and shifting on said frame, means adapted to shift said cushion on said frame in a predetermined manner when the cushion is rotated thereon, said means including a cam track disposed at one end of the supporting frame and members mounted adjacent opposite ends of the seat cushion for movement therewith, adapted to coact with said cam track at predetermined times during rotation of the cushion to shift the same, and means adapted to engage one of said members for latching the seat cushion in either of two reversed seating positions, said means including a member at the aisle end of the seat adapted to engage selectively with said members adjacent the ends of the seat cushion.

8. In a seat of the character described, in combination, a supporting frame, a plate mounted on the supporting frame, said plate having a slot and a circular cam track surrounding the slot, and having a peripheral flange, a cushion rest, a disk secured to the cushion rest and having a hub and a peripheral flange, a king pin seated in said hub and slot, and members secured to said disk coacting with the circular flange on said plate, the peripheral flange of said disk resting on the circular and peripheral flanges of said plate, whereby the center of the cushion rest is supported and steadied during rotation and movement on the supporting frame.

9. In a seat of the character described, in combination, a supporting frame, a plate mounted on the supporting frame, said plate having a slot and a circular cam track surrounding the slot, and having a peripheral flange, a cushion rest, a disk secured to the cushion rest and having a hub and a peripheral flange, a king pin seated in said hub and slot, members secured to said disk coacting with the circular flange on said plate, the peripheral flange of said disk resting on the circular and peripheral flanges of said plate, whereby the center of the cushion rest is supported and steadied during rotation and movement on the supporting frame, and coacting means on said supporting frame and cushion rest for shifting the cushion rest on the supporting frame as the cushion rest is rotated thereon.

10. In a seat of the character described, in combination, a supporting frame, a seat cushion supported for rotation and shifting on said frame, members mounted adjacent opposite ends of the seat cushion for movement therewith, a cam track at one end of the supporting frame adapted to coact with one of said members as the seat cushion is revolved to shift the seat cushion bodily on the supporting frame, and means at the opposite end of the supporting frame adapted to coact selectively with said members to latch the seat cushion in predetermined positions.

11. In a seat of the character described, in combination, a supporting frame, a seat cushion supported for rotation and shifting on said frame, members mounted adjacent opposite ends of the seat cushion for movement therewith, a cam track at one end of the supporting frame adapted to coact with one of said members as the seat cushion is revolved to shift the seat cushion bodily on the supporting frame, and means at the opposite end of the supporting frame adapted to coact selectively with said members to latch the seat cushion in predetermined positions, said cam track and the latch means supporting the seat cushion adjacent its opposite ends when the seat cushion is facing in either seating direction.

12. In a seat of the character described, in combination, a supporting frame, a seat cushion supported for rotation and shifting on said frame, members mounted adjacent opposite ends of the seat cushion for movement therewith, a cam track at one end of the supporting frame into which said members are adapted to project as the cushion is revolved to shift said cushion laterally and a latch at one end of the supporting frame adapted to engage said members selectively to latch the seat in either of two reversed seating positions.

13. In a seat of the character described, in combination, a supporting frame, a seat cushion supported for rotation and shifting on said frame, rollers mounted adjacent opposite ends of the seat cushion for movement therewith, a cam track at one end of the supporting frame adapted to selectively receive said rollers and a latch at the other end of the supporting frame adapted to engage said rollers selectively to latch the seat in either of two reversed seating positions, said latch means including a plunger, a cap mounted on the plunger recessed to receive said members, and resilient means maintaining the plunger and cap in active position.

14. In a seat of the character described, in combination, a supporting frame, a seat cushion supported for rotation and shifting on said frame, members mounted adjacent opposite ends of the seat cushion for movement therewith, means on said supporting frame adapted to selectively engage said members to shift said cushion as it is revolved and a latch secured to said supporting frame and adapted to engage said members selectively to latch the seat in either of two reversed seating positions, said latch means including a plunger, a cap mounted on the plunger recessed to receive said members, and resilient means maintaining the plunger and cap in active position, said cap having a tapered outer surface, whereby said members are self-seating in the recess of the cap when rotated into engagement therewith.

15. In a seat of the character described, in combination, a supporting frame, a seat cushion supported for rotation and shifting on said frame, members mounted adjacent opposite ends of the seat cushion for movement therewith, means at one end of said supporting frame adapted to selectively engage said members to shift said cushion as it is revolved and a latch at the other end of the supporting frame adapted to engage said members selectively to latch the seat in either of two reversed seating positions, said latch means including a plunger, a cap mounted on the plunger recessed to receive said members, resilient means maintaining the plunger and cap in active position, and a pedal secured to said plunger, whereby the plunger may be depressed to release said members and permit the seat cushion to be revolved.

16. A latch of the character described including a pair of parallel plungers, a conical cap secured to the tops of said plungers, springs surrounding said plungers, maintaining them in raised position, a forked member having portions secured to said plungers below said springs and having upper portions slidably encircling said plungers above said springs, and an abutment for the lower ends of said springs, said forked member having a pedal portion whereby said plungers may be depressed against the action of said springs.

This specification signed this fifth day of August, 1926.

CONRAD T. HANSEN.
ALFRED B. BELL.